US005768163A

United States Patent [19]
Smith, II

[11] Patent Number: 5,768,163
[45] Date of Patent: Jun. 16, 1998

[54] VERSATILE ATTACHMENT OF HANDHELD DEVICES TO A HOST COMPUTING SYSTEM

[75] Inventor: Donald X. Smith, II. Corvallis, Oreg.

[73] Assignee: Hewlett-Packard, Palo Alto, Calif.

[21] Appl. No.: 632,211

[22] Filed: Apr. 15, 1996

[51] Int. Cl.⁶ ........................................ G06F 1/16
[52] U.S. Cl. ................ 364/705.01; 364/708.1; 364/710.14; 361/683; 361/686
[58] Field of Search ............... 364/705.01, 705.05, 364/705.06, 708.1, 709.1, 710.14; 361/679, 683, 686

[56] References Cited

U.S. PATENT DOCUMENTS

| | | | |
|---|---|---|---|
| 4,545,023 | 10/1985 | Mizzi | 364/709 |
| 4,739,316 | 4/1988 | Yamaguchi et al. | 340/711 |
| 4,827,347 | 5/1989 | Bell | 358/224 |
| 4,893,326 | 1/1990 | Duran et al. | 379/53 |
| 4,897,732 | 1/1990 | Kinoshita et al. | 358/335 |
| 4,901,160 | 2/1990 | Kinoshita et al. | 358/335 |
| 5,020,090 | 5/1991 | Morris | 379/58 |
| 5,043,721 | 8/1991 | May | 340/825.44 |
| 5,127,050 | 6/1992 | Takahashi et al. | 379/428 |
| 5,231,501 | 7/1993 | Sakai | 358/209 |
| 5,278,779 | 1/1994 | Conway | 364/708.1 |
| 5,281,962 | 1/1994 | Vanden Heuvel et al. | 340/825.44 |
| 5,307,055 | 4/1994 | Baskin et al. | 345/1 |
| 5,402,170 | 3/1995 | Parulski et al. | 348/211 |
| 5,410,497 | 4/1995 | Viletto | 364/708.1 |
| 5,438,359 | 8/1995 | Aoki | 348/207 |
| 5,440,449 | 8/1995 | Scheer | 361/686 |
| 5,442,512 | 8/1995 | Bradbury | 361/683 |
| 5,459,637 | 10/1995 | Ma et al. | 361/686 |
| 5,544,010 | 8/1996 | Schultz et al. | 361/686 |
| 5,594,617 | 1/1997 | Foster et al. | 364/708.1 |
| 5,594,619 | 1/1997 | Miyagawa et al. | 361/681 |
| 5,619,395 | 4/1997 | McBride | 361/681 |
| 5,627,728 | 5/1997 | Ma et al. | 361/686 |
| 5,629,833 | 5/1997 | Ido et al. | 361/681 |

FOREIGN PATENT DOCUMENTS

| | | | |
|---|---|---|---|
| 0 705 037 | 4/1996 | European Pat. Off. | H04N 7/14 |
| 2 289 555 | 11/1995 | United Kingdom | G06F 3/00 |
| WO 91/06048 | 5/1991 | WIPO | G06F 1/16 |

OTHER PUBLICATIONS

IBM Technical Disclosure Bulletin, vol. 39 No. 04 Apr. 1996 pp. 311–313, XP 000587510. "Camera Tilt Mechanism".
*Personal Computer with Integral Global Positioning System*, IBM Technical Disclosure Bulletin, vol. 37 No. 02B Feb. 1994, pp. 313–314.

*Primary Examiner*—David H. Malzahn

[57] ABSTRACT

The versatility of a portable computer is expanded by placing a hinged connector on an outside of a case of the portable computer. The hinged connector includes an electrical connector to which a handheld device is connected and disconnected. A hinge connects the hinged connector to the case. The hinge allows the handheld device, when connected to the electrical connector, to rotate position with respect to the case.

29 Claims, 8 Drawing Sheets

VERSATILE ATTACHMENT OF HANDHELD DEVICES TO A HOST COMPUTING SYSTEM

BACKGROUND

The present invention concerns computing devices and pertains particularly to the versatile attachment of handheld devices to a host computing system such as a portable computer.

Users of portable computers (such as notebook computers or laptop computers) seldom rely exclusively on their personal computer for all of their personal information management (PIM). PIM generally includes appointments, to-do lists, telephone books. The low usage rate of portable computers for PIM is variously caused.

One reason some users do not use portable computers for PIM is that personal computers are too awkward to use everywhere for simple spontaneous tasks, such as glancing at the day's schedule or taking down a phone number. Portable computers are often carried in a briefcase or bag. The display and keyboard are hidden when the computer is being carried. Users do not want to wait for the personal computer to boot up. There have been attempts to make portable computers less awkward for spontaneous tasks. For example, some vendors have implemented "instant on" of portable computers. This is done, for example, using a "sleep" or "hibernation" mode. However, often when in "sleep" or "hibernation" mode, the portable computer uses battery power at a high rate, which can make it unacceptable to leave the portable computer in such a mode for long periods of time.

Another reason some users do not use portable computers for PIM is that portable computers are relatively bulky and people do not want to carry a portable computer with them wherever they go. In the opinion of many, even the very smallest notebooks are too bulky to carry everywhere. They do not fit in a shirt pocket or a small purse. Additionally, portable computers are generally not equipped to capture "casual" information such as scribbles, voice memos and snapshots.

Some of the above described weaknesses of portable computers have been addressed by the development of personal digital assistants (PDAs) or personal organizers. PDAs and personal organizers are relatively small and are generally designed to provide some ability to capture casual information. However, because they do not have a full-sized keyboard or display, they are not significantly limited for input/output of significant amounts of information. Additionally, PDAs and personal organizers have generally been poorly integrated with personal computers and desktop computers in such a way that information may be simply and naturally shared.

SUMMARY OF THE INVENTION

In accordance with the preferred embodiment of the present invention, the versatility of a host computer is expanded by placing a hinged connector on an outside of a case of the host computer. The host computer is, for example, a portable computer such as a notebook computer or a laptop computer. The hinged connector includes an electrical connector to which a handheld device is connected and disconnected. A hinge connects the hinged connector to the case. The hinge allows the handheld device, when connected to the electrical connector, to rotate position with respect to the case.

The handheld device can perform any of a variety of tasks. For example, the handheld device is a media clip pad which includes a touch-sensitive display. The media clip pad additionally can include a digital camera. In one embodiment of the invention, the digital camera includes a camera eye which is rotatable 270 degrees.

The hinged connector includes, for example, a speaker system. In one embodiment a back of the speaker is expandable to allow for the increase in air volume resulting in a richer sound quality.

The media clip pad, or other handheld device, additionally can include an expansion port. This allows an additional device, such as a digital camera, to be separately attachable to the media clip pad.

Other handheld devices, such as a cellular phone or a pager, can be directly connectable to the hinged connector or to the expansion port of the media clip pad.

In one embodiment of the present invention, the electrical connector is compatible with a personal computer memory card internal association (PCMCIA) card electrical interface. Alternatively, the electrical connector is compatible with a PCI bus interface, a SCSI bus interface, or some other standard or non-standard electrical interface.

In order to allow for remote control for simple manipulation of the host computer from short range, the handheld device includes, for example, an infrared (IR) transceiver. This is advantageous, for example, for tasks such as presentation control. The IR transmitter is also useful for "beaming" information to and from other IR devices using, for example, an Infrared Data Association (IrDA) standard protocol.

The present invention greatly increases the versatility of a portable computer. The invention allows separately operable handheld devices to be conveniently part of a portable computer or to be separate versatile stand-alone units.

DESCRIPTION OF THE PREFERRED EMBODIMENT

Figure 1:
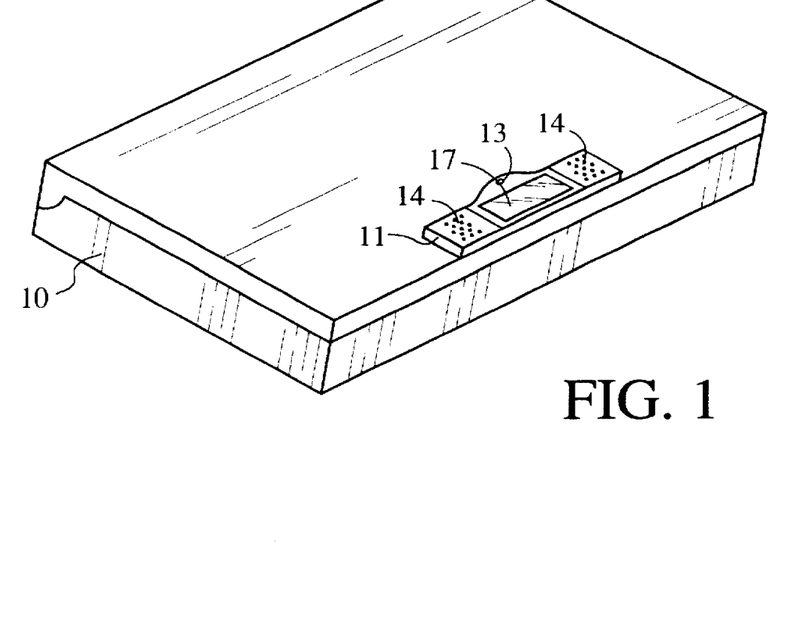
FIG. 1 shows a media clip pad attached to a personal computer in accordance with a preferred embodiment of the present invention.

FIG. 1 shows a media clip pad 11 connected to a portable computer 10. Media clip pad 11 can be attached to or detached from portable computer 10 and/or a desktop computer. Media clip pad 11 includes microphone/speaker units 14, a digital camera 13 and a display/write pad 17. In the stowed position (i.e., when media clip pad 11 is folded and latched tight against the case of portable computer 10) display/write pad 17 faces outward, as shown in FIG. 1. When portable computer 10 is in use (i.e., the case of portable computer 10 is open and a user is utilizing the keyboard and main display), media clip pad 11 may be rotated to a position visible and accessible to the user of portable computer 10.

Display/write pad 17 provides a "spontaneous use" display for portable computer 10 which simplifies taking along bits of personal information such as appointments, phone number, notes and miscellaneous data files. Because display/write pad 17 includes a write pad feature, scribbled notes may be recorded. Additionally, through microphone/speaker units 14, voice memos may be recorded. Other spontaneous tasks include controlling portable computer 10 without opening the case. For example, in the preferred embodiment it is possible to control a CD drive of portable computer 10 without utilizing the main display of portable computer 10.

In the preferred embodiment, digital camera 13 functions as a digital "still picture" camera when media clip pad 11 is detached from personal computer 10. When media clip pad 11 is attached to personal computer 10 or another computing system, media clip pad 11 utilizes the additional resources available to record full motion video.

Figure 2:
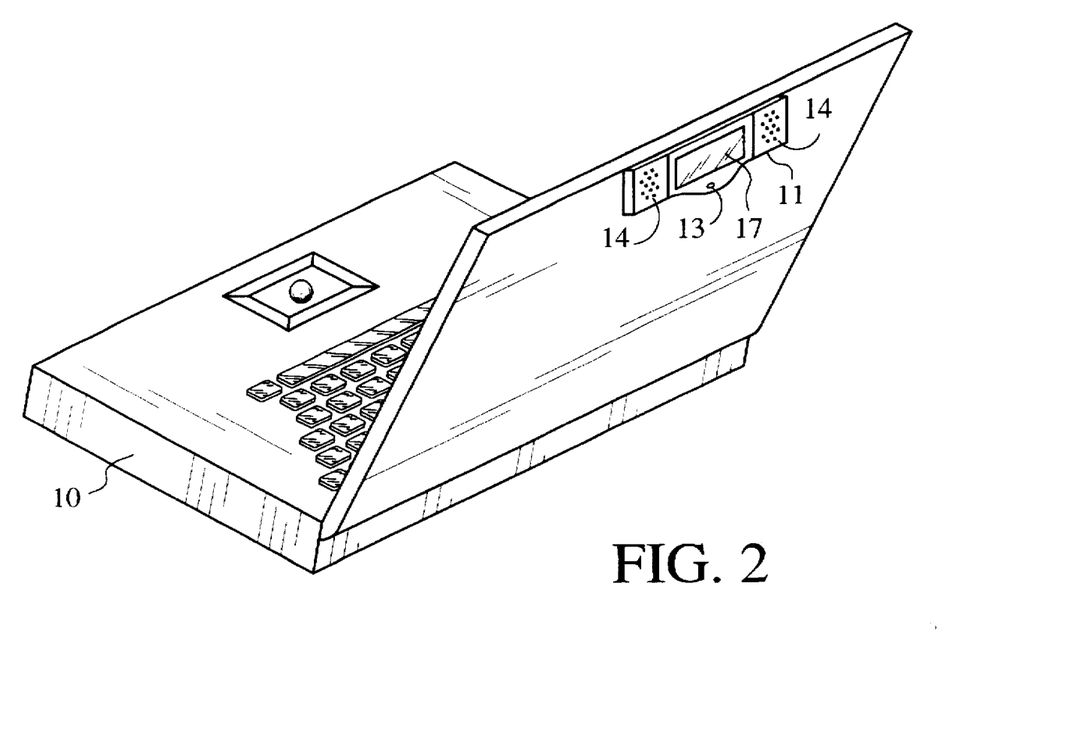
FIG. 2 shows use of the media clip pad in a first position when the portable computer shown in FIG. 1 is opened in accordance with a preferred embodiment of the present invention.

As illustrated by FIG. 2, media clip pad 11 is connected to portable computer 10 by way of a hinge assembly. The hinge assembly allows rotation of the position of media clip 11 with respect to the top of portable computer 10. In FIG. 2, portable computer is opened and media clip pad 11 has been rotated to be perpendicular to the surface on which portable computer 10 rests. In this position, display 17 is viewable to a person positioned behind portable computer 10. In this position, microphone/speaker units 14 can record or play audio for a guest or audience. Digital camera 13 can be used for desktop video conferencing, video capture and/or the capture of still images. As shown by FIG. 2, portable computer 10 includes a main display 16.

Figure 3:
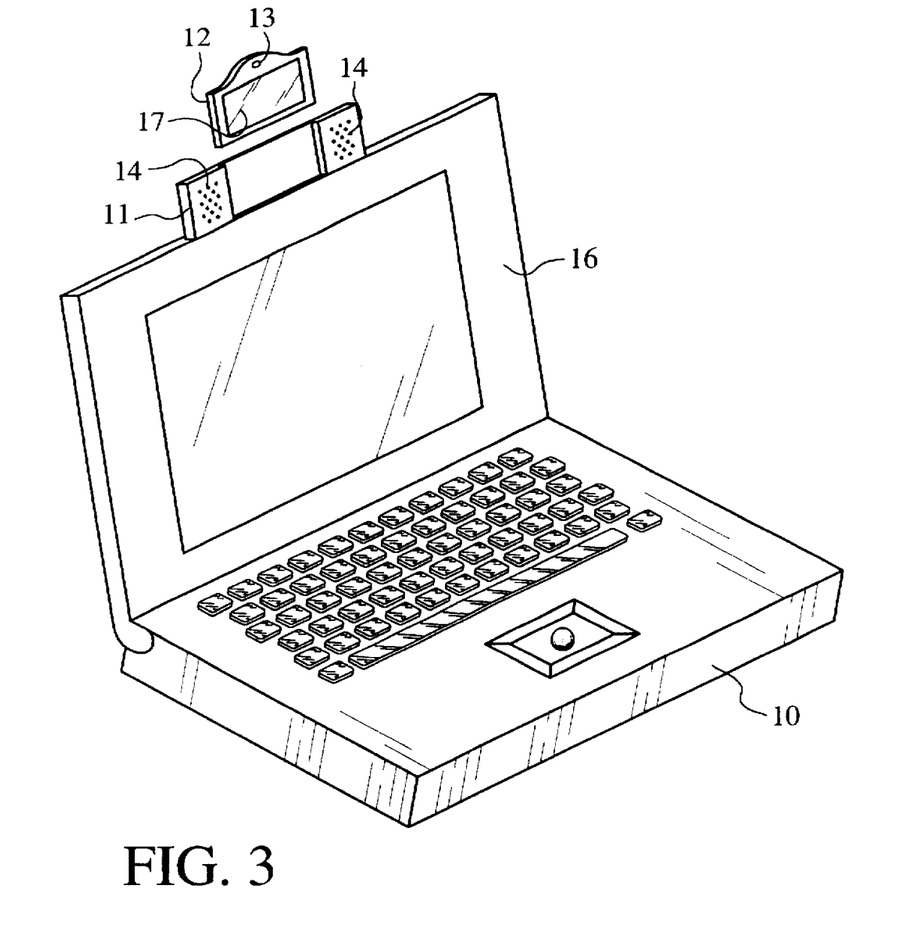
FIG. 3 shows use of the media clip pad in a second position when the portable computer shown in FIG. 1 is opened in accordance with a preferred embodiment of the present invention.

In FIG. 3, portable computer is opened and media clip pad 11 has been rotated to face an operator of portable computer 10. In this position, display 17 is viewable to a user of portable computer 10. As shown by FIG. 3, a modular portion 12 of media clip pad 11 is removable. Modular portion 12 includes a digital camera 13 and display/write pad 17. In the rotated position of media clip pad 11 shown in FIG. 3, microphone/speaker units 14 can record or play audio for the user of portable computer 10. When modular portion 12 is attached to media clip pad 11, digital camera 13 can be used for desktop video conferencing, video capture and/or the capture of still images.

Figure 4:
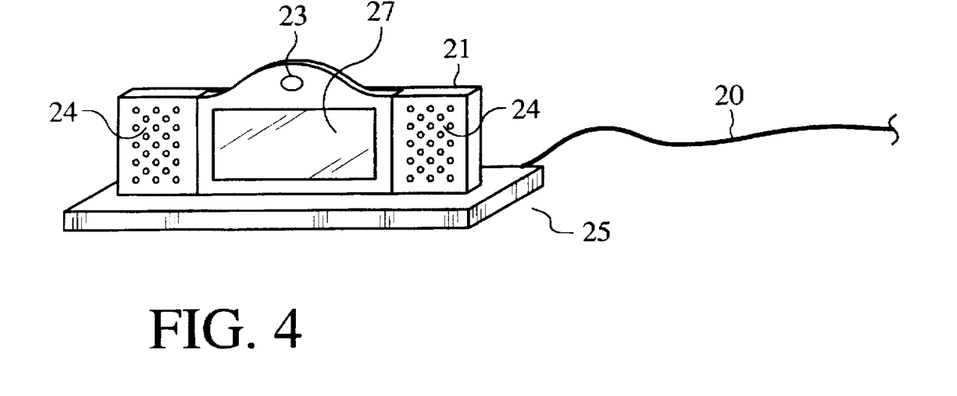
FIG. 4 shows use of a media clip pad in a desktop holder in accordance with preferred embodiment of the present invention.
Figure 5:
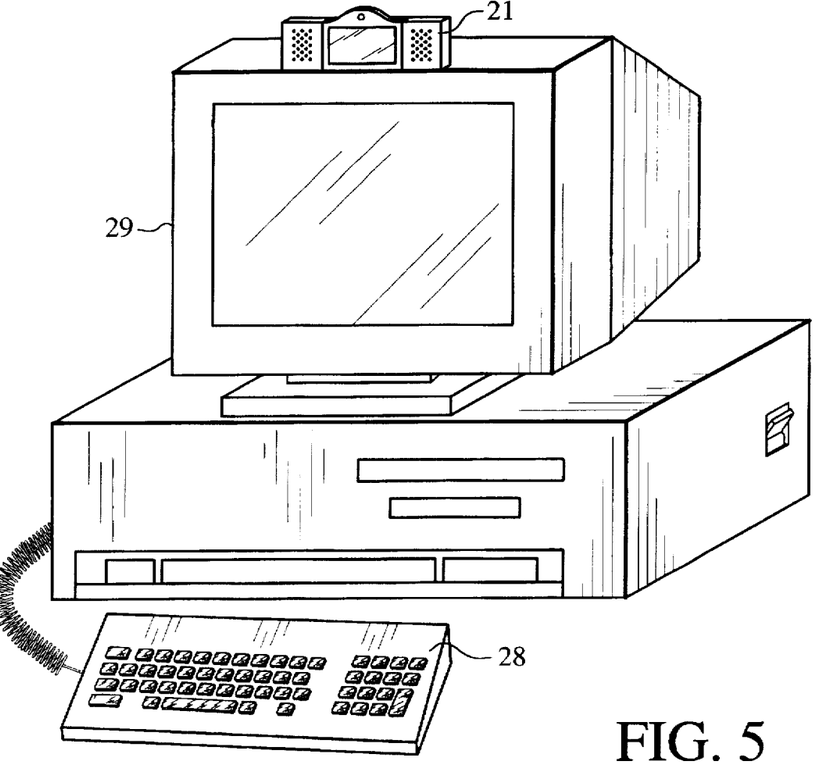
FIG. 5 shows use of a media clip pad placed on a monitor in accordance with a preferred embodiment of the present invention.

FIG. 4, shows a media clip pad 21 in which speakers 24, a digital camera 23 and a display 27 are all integrated in a single module. Media clip pad 27 can be mounted on a stand 25 which is connected through a cable 20 to a computing system. For example, stand 25 may be integrated as part of a monitor 29, as shown in FIG. 5. Alternately, stand 25 may be placed on monitor 29. This is particularly useful, for example, when a docking system is used to connect a personal computer to monitor 29 and a keyboard 28. Alternatively, media clip pad 21 can remain connected to a portable computer and available for use by a user even when the portable computer is docked, provided that docking system does not cover the portion of the portable computer to which the docking system is attached.

Figure 16:
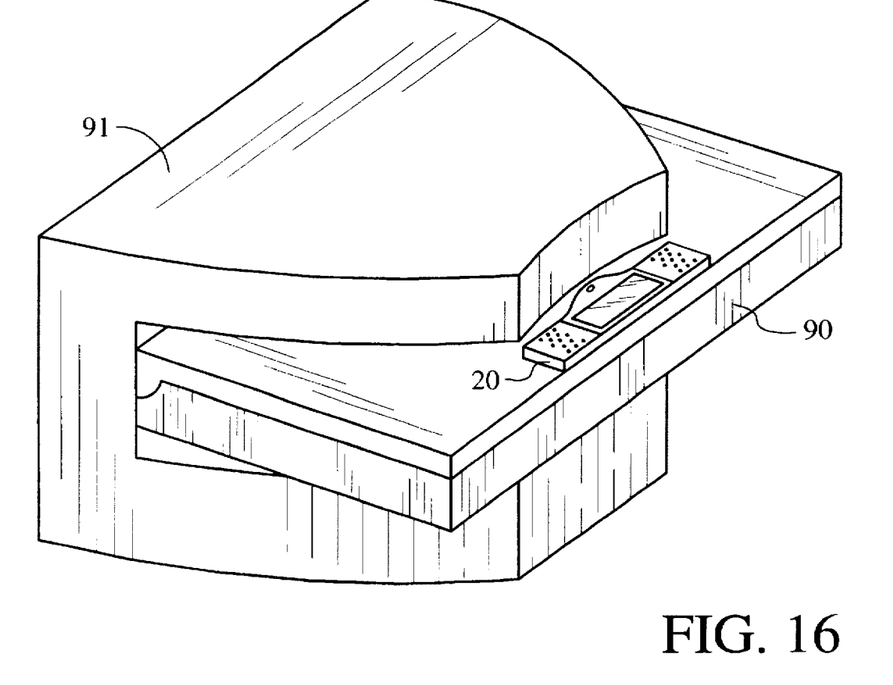
FIG. 16 shows a media clip attached to a portable computer connected to a docking station in accordance with a preferred embodiment of the present invention.

This is illustrated by FIG. 16 where media clip pad 21 is shown attached to a portable computer 90 and usable while portable computer 91 is connected to a docking station 91.

Figure 6:
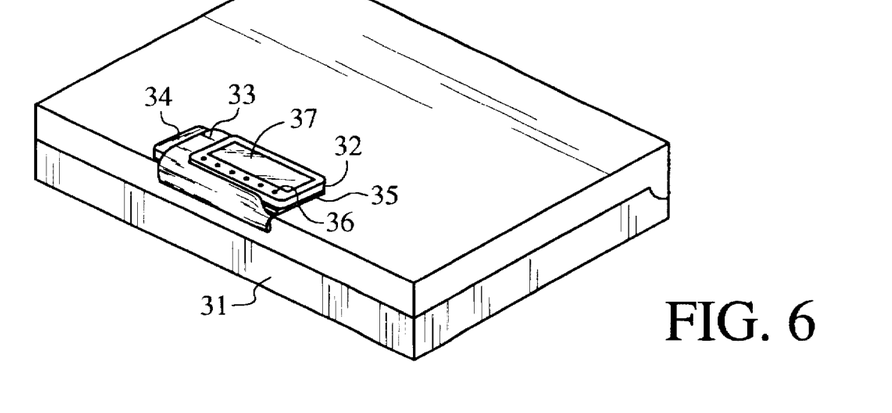
FIG. 6 shows details of how the media clip pad is attached to a personal computer in accordance with a preferred embodiment of the present invention.

FIG. 6 shows an implementation of a hinged connector 33 integrated as part of a portable computer 31. A media clip pad 32 slides right to left into hinged connector 33. Additional devices may be connected to media clip pad 32, however, in FIG. 6, a protective filler cap 35 is placed to protect an expansion port of media clip pad 32. An eject button 34 of hinged connector 33 is used to release media clip pad 32 from hinged connector 33 pushing left to right. Eject button pushes equally on the corners of media clip pad 32, overcoming the friction of connection pins within the electrical connector within hinged connector 33. Media clip pad 32 includes a display/write pad 37 and touchpad buttons 36. Touchpad buttons 36 function as softkeys for user input.

Figure 7:
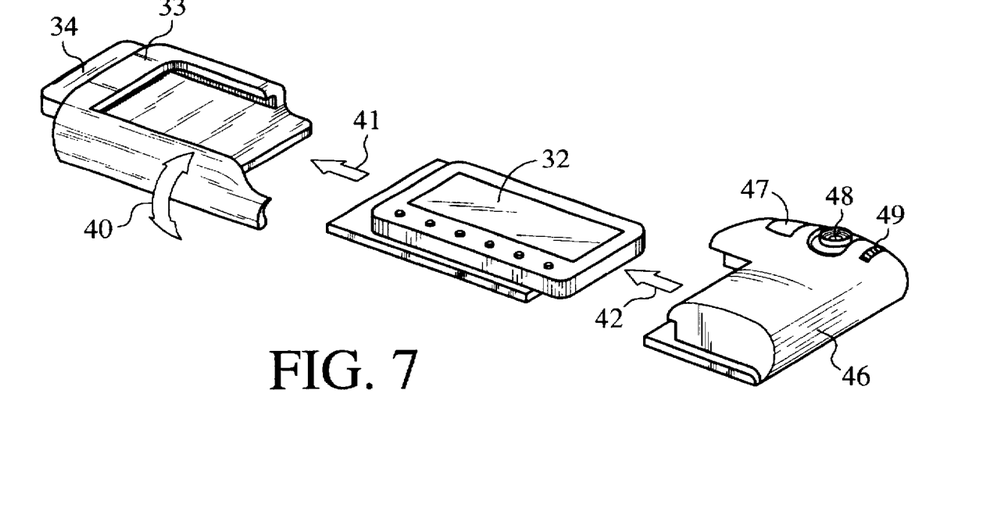
FIG. 7 shows details of how a digital camera is attached to the media clip pad shown in FIG. 6 in accordance with a preferred embodiment of the present invention.

FIG. 7 shows the insertion along a direction of media clip pad 32 into hinged connector 33. As shown in FIG. 7, hinged connector 33 can rotate in directions 40 with respect to portable computer 31. A digital camera 46 can be inserted into the expansion port of media clip pad 32 along a direction 42. Digital camera 46 includes a camera eye 48, a flash assembly 47, and a thumb wheel 49. Camera eye 48 and flash assembly 47 are rotatable 270 degrees. This allows proper orientation of digital pictures/video from digital camera 46 both when media clip pad 32 is rotated to face a user using portable computer 31 and when media clip pad 32 is rotate to face a user or small audience behind portable computer 31. In the preferred embodiment, flash assembly 47 rotates along with camera eye 48, keeping flash unit 47 always pointed in the direction of camera eye 48. Thumb wheel 49 is used to rotate camera eye 48 and flash assembly 47. A portion of the 270 degree range allows camera eye 48 to be rotated inward (hidden) for protection when not in use.

Figure 8:
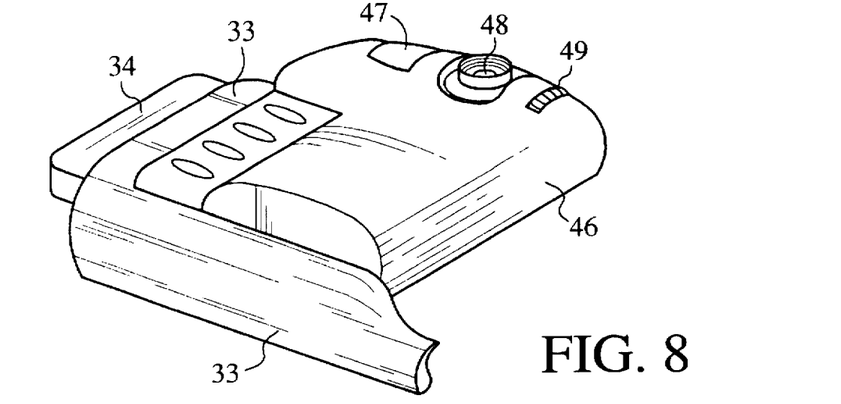
FIG. 8 shows how the digital camera shown in FIG. 7 is directly attachable to a hinged connector on a personal computer in accordance with a preferred embodiment of the present invention.

In a preferred embodiment, the electrical connector portion of hinged connector 33 is identical to the electrical connector of the expansion port of media clip pad 32. Thus, as shown in FIG. 8, digital camera 46 can be directly attached to hinged connector 33.

Figure 17:
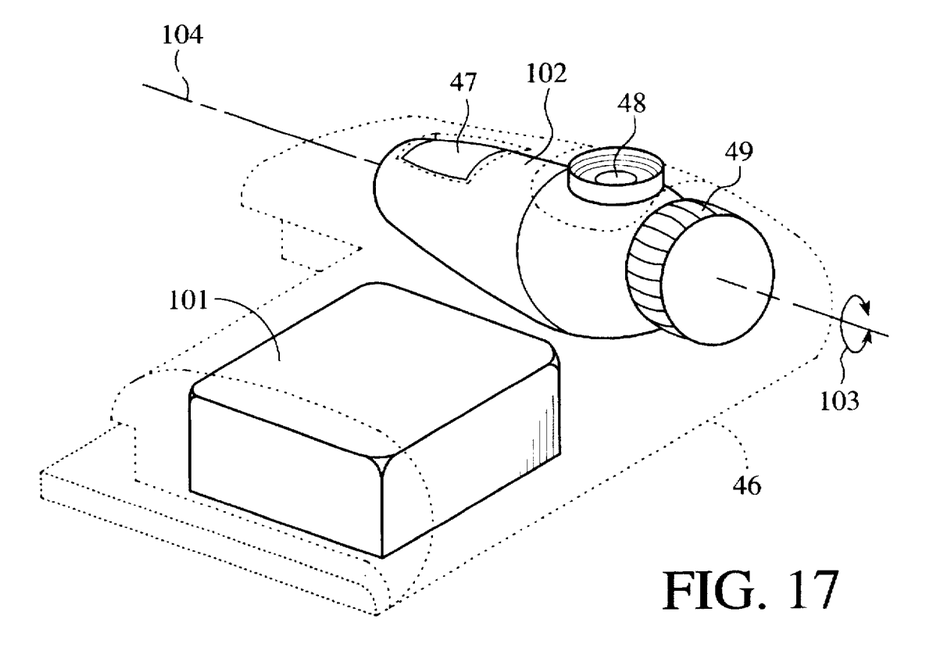
FIG. 17 shows additional detail of the digital camera shown in FIG. 8 in accordance with a preferred embodiment of the present invention.

FIG. 17 shows additional detail of digital camera 46. As seen from FIG. 17, flash unit 47 and camera eye 48 are mounted on a single unit 102. Thumb wheel 49 rotates unit 102 around an axis 104 as represented by arrow 103. Digital camera 46 includes a standard lithium camera battery 101 along with other circuitry.

Figure 9:
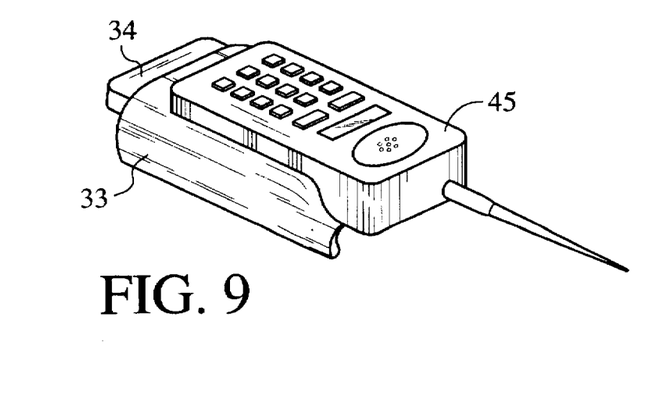
FIG. 9 shows how a cellular phone is directly attachable to a personal computer in accordance with a preferred embodiment of the present invention.

As illustrated by FIG. 9, any device with an appropriate connector can be attached to hinged connector 33. Thus, FIG. 9 shows a cellular phone 43 attached to hinged connector 33. Additionally, other devices, for example a two-way pager card or IBM ChipCard device can be attached.

Figure 10:
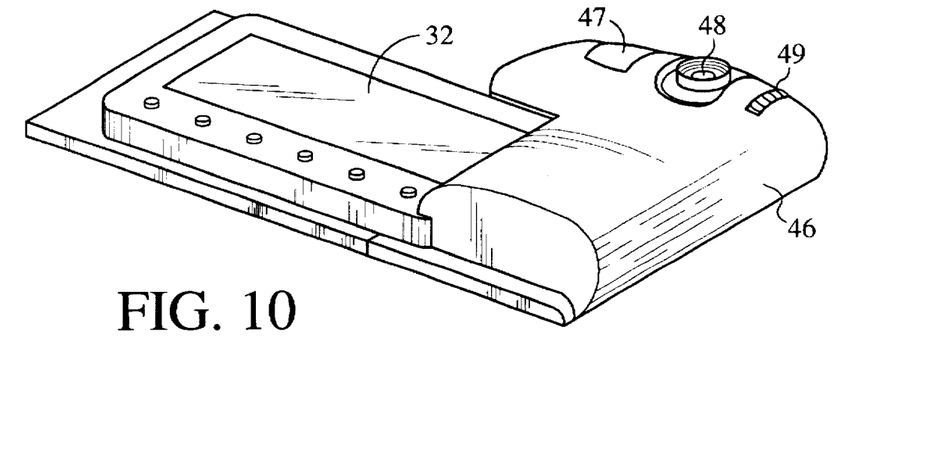
FIG. 10 illustrates use of the digital camera and the media clip pad shown in FIG. 7 separately from a portable computer in accordance with a preferred embodiment of the present invention.

As shown in FIG. 10, digital camera 46 can remain attached to media clip pad 32 even when media clip pad 32 is separated from hinged connector 33. In this configuration, the display on the media clip pad 32 functions as a viewfinder for digital camera 46. In addition, any device with an appropriate connector can be attached to media clip pad 32.

Figure 11:
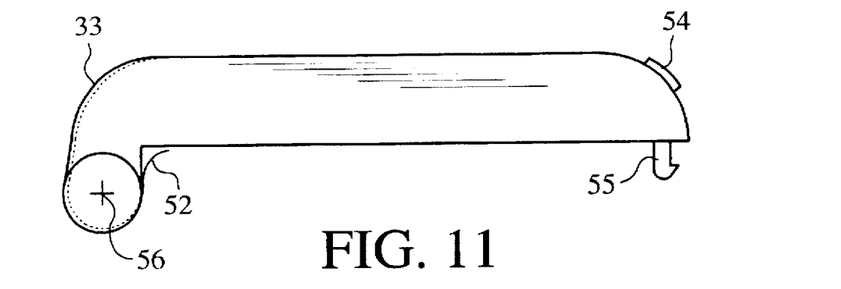
FIG. 11 shows the hinge within a media clip pad holder on a personal computer in accordance with a preferred embodiment of the present invention.

FIG. 11 shows additional physical implementation detail of hinged connector 33. Hinged connector 33 is connected to portable computer 31 via a hinge 56. A hook 55 is used to keep hinged connector 33 flat against portable computer 31 when hinged connector 33 is in the stowed position. A button 54 is depressed in order to allow adjustment of the position of hinged connector 33 relative to portable computer 31. Friction at the assembly of hinge 56 allows hinged connector 33 to remain relatively stable in a position selected by a user. Electrical connection of a device attached to hinged connector 33 and portable computer 31 is achieved through a connector cable 52, placed through the hinge assembly of hinge 56.

Figure 12:
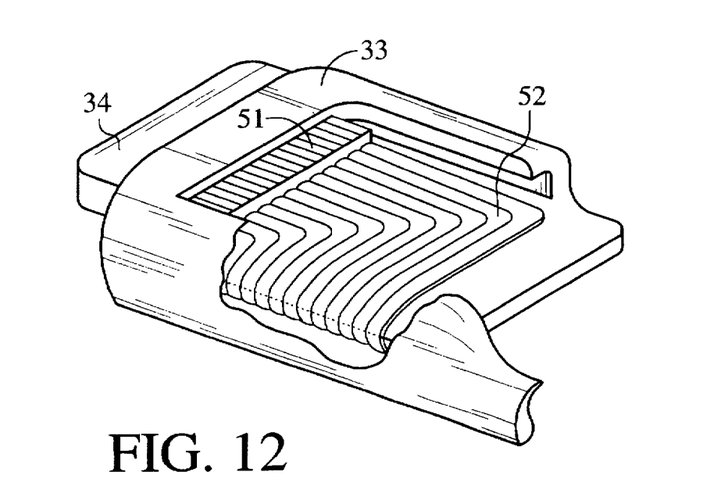
FIG. 12 shows a electrical connector within a media clip pad holder on a personal computer, in accordance with a preferred embodiment of the present invention.

FIG. 12 shows additional electrical implementation detail of hinged connector 33. Hinged connector 33 includes an electrical connector 51. For example, electrical connector 51 is compatible with a personal computer memory card internal association (PCMCIA) card electrical interface. The use of a PCMCIA card interface allows connection of any PCMCIA card to be connected to portable computer 31 via hinged connector 33 and allows any PCMCLA card to be connected to the expansion port of media clip pad 32. Connector cable 52 is shown in FIG. 12 to be a mylar (or mylar-like) sheet with trace lines. Connector 52 is hidden with either a glue-in plate or is molded directly into hinged connector 33. Alternately, electrical connector 51 is compatible with a PCI bus interface, a SCSI bus interface, or some other standard or non-standard electrical interface.

Figure 13:
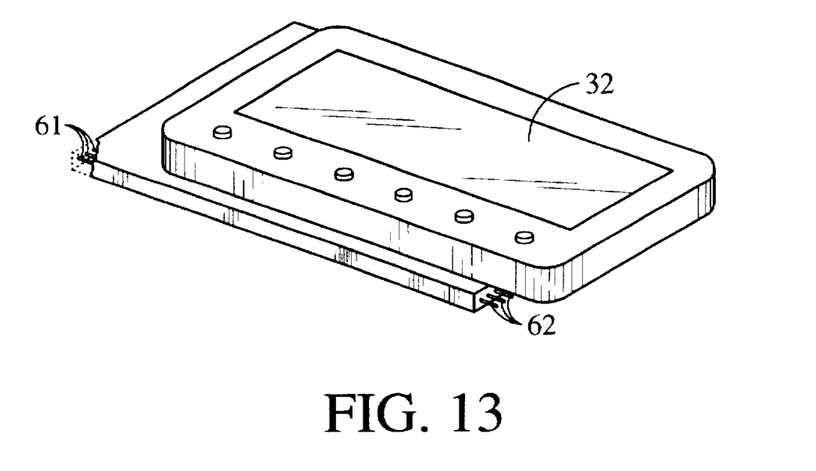
FIG. 13 shows a electrical connector within a media clip pad in accordance with a erred embodiment of the present invention.

FIG. 13 shows additional electrical implementation detail of media clip pad 32. Media clip pad 32 includes a female electrical connector 61 and a male electrical connector 62. For example, both electrical connector 61 and electrical connector 62 are compatible with a PCMCIA card electrical interface. Alternately, electrical connectors 61 and 62 are compatible with a PCI bus interface, a SCSI bus interface, or some other standard or non-standard electrical interface. Electrical connector 61 is used to connect media clip pad 32 to hinged connector 33. Electrical connector 62 is used as the expansion port of media clip pad 32.

Figure 14:
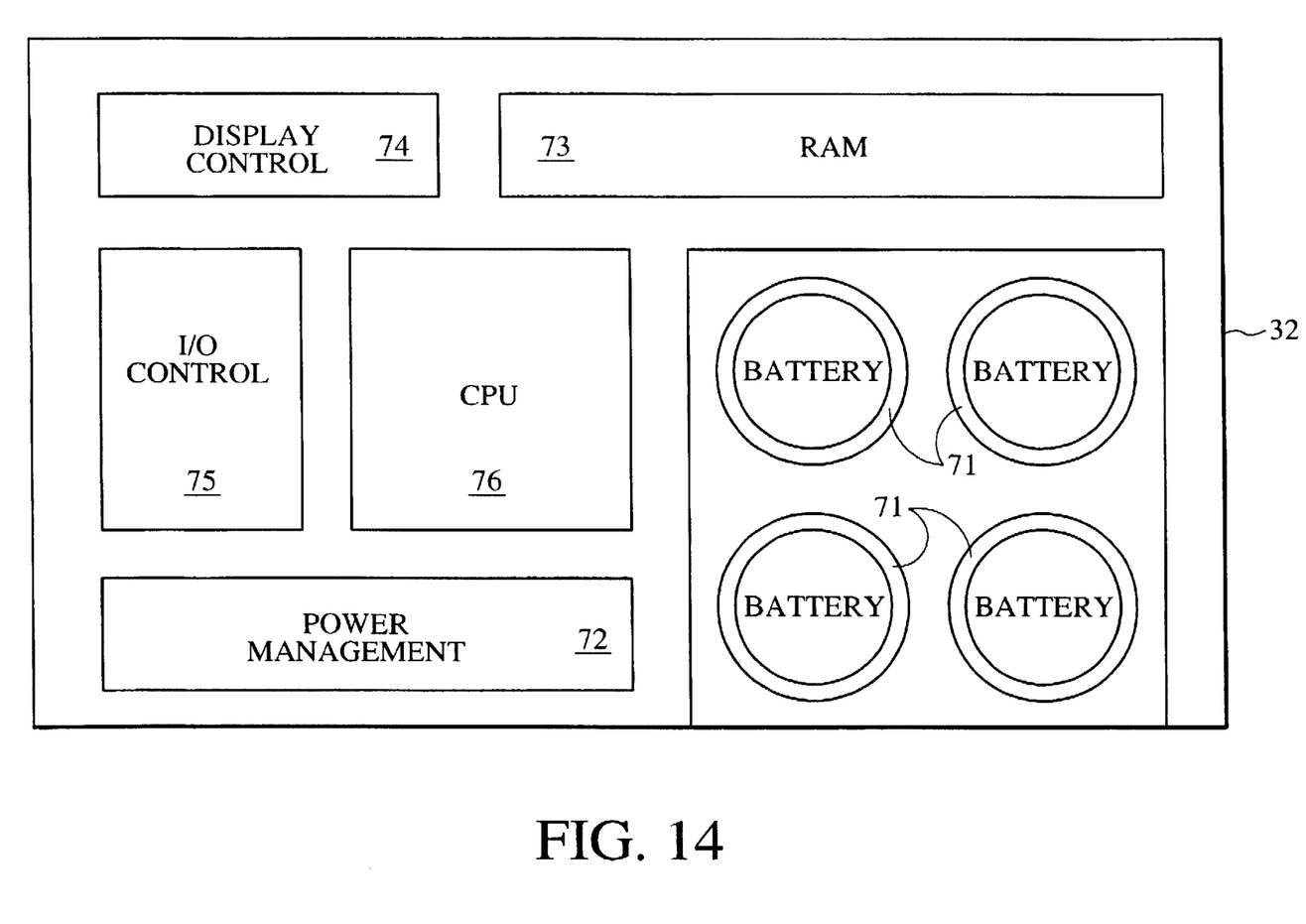
FIG. 14 shows the arrangement of circuitry within a media clip pad in accordance with a preferred embodiment of the present invention.

FIG. 14 shows a simplified block diagram of the layout of circuitry within media clip pad 32. Media clip pad 32 includes a display controller 74, random access memory (RAM) 73, an input/output (I/O) controller 75, power management circuitry 72 and a central processing unit (CPU) 76. For a local power source, media clip pad 32 uses batteries 71.

Figure 15:
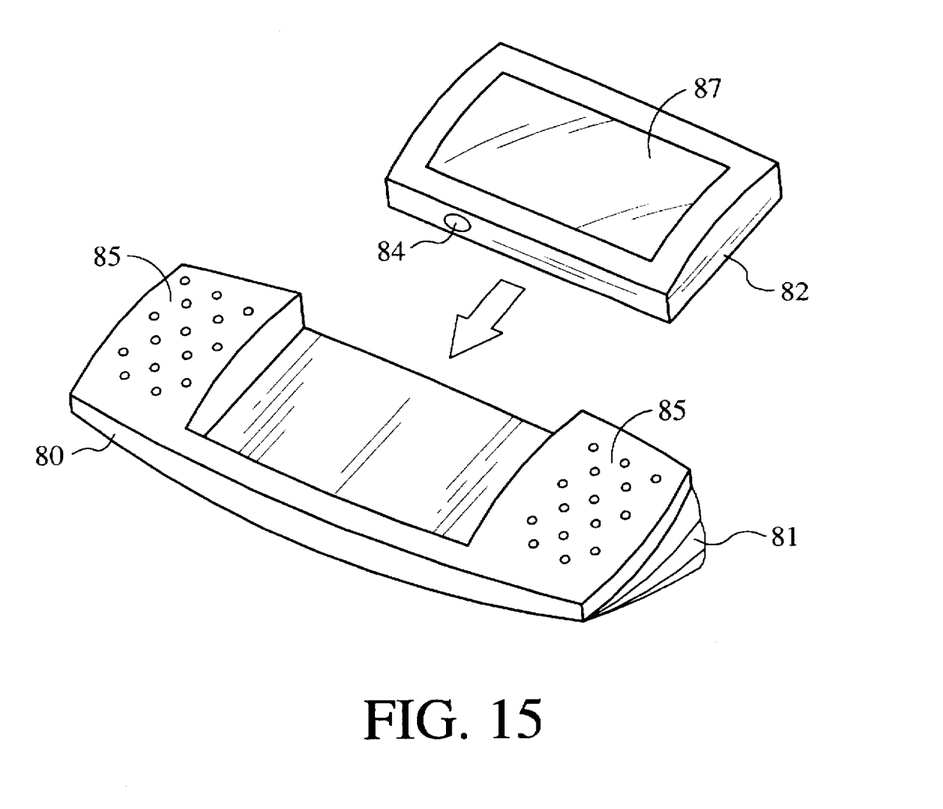
FIG. 15 shows a media clip pad with expandable speakers and an infrared (IR) transceiver in accordance with a preferred embodiment of the present invention.

FIG. 15 shows a media clip pad 80. As illustrated by dotted lines 81, speakers 85 expand when media clip pad 80 is tilted up. Speakers 85 expand to increase air volume for a richer sound quality. Removable portion 82 of media clip pad 80 includes a liquid crystal diode (LCD) display and a infrared transceiver 84. IR transceiver 84 is used as an remote control for simple manipulation of the portable computer from short range or to exchange information with other infrared devices. This is advantageous, for example, for tasks such as presentation control.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computing system comprising:

a case;

a primary display available to a user when the case is opened; and, a hinged connector on an outside of the case, the hinged connector including:

an electrical connector to which a handheld device is connected and disconnected, and a hinge which connects the hinged connector to the case, the hinge allowing the handheld device, when connected to the electrical connector, to rotate position with respect to the case;

wherein the hinged connector comprises:

an expandable speaker system, in which a back of the speaker is expandable.

2. A computing system comprising:

a case;

a primary display available to a user when the case is opened; and, a hinged connector on an outside of the case, the hinged connector including:

an electrical connector to which a handheld device is connected and disconnected, and a hinge which connects the hinged connector to the case, the hinge allowing the handheld device, when connected to the electrical connector, to rotate position with respect to the case;

wherein the handheld device is a media clip pad which includes a touch-sensitive display.

3. A computing system as in claim 2 wherein the handheld device additionally includes a digital camera.

4. A computing system as in claim 3 wherein the digital camera includes a camera eye which is rotatable.

5. A computing system as in claim 2 wherein the media clip pad additionally includes an expansion port.

6. A computing system as in claim 5 wherein a digital camera is connectable to the expansion port.

7. A computing system comprising:

a case;

a primary display available to a user when the case is opened; and, a hinged connector on an outside of the case, the hinged connector including:

an electrical connector to which a handheld device is connected and disconnected, and a hinge which connects the hinged connector to the case, the hinge allowing the handheld device, when connected to the electrical connector, to rotate position with respect to the case;

wherein the handheld device is a cellular phone.

8. A computing system comprising:
   a case;
   a primary display available to a user when the case is opened; and,
   a hinged connector on an outside of the case, the hinged connector including:
      an electrical connector to which a handheld device is connected and disconnected, and
      a hinge which connects the hinged connector to the case, the hinge allowing the handheld device, when connected to the electrical connector, to rotate position with respect to the case;
   wherein the handheld device is a pager.

9. A computing system comprising:
   a case;
   a primary display available to a user when the case is opened; and,
   a hinged connector on an outside of the case, the hinged connector including:
      an electrical connector to which a handheld device is connected and disconnected, and
      a hinge which connects the hinged connector to the case, the hinge allowing the handheld device, when connected to the electrical connector, to rotate position with respect to the case;
   wherein the electrical connector is compatible with a personal computer memory card internal association (PCMCIA) card electrical interface.

10. A computing system comprising:
    a case;
    a primary display available to a user when the case is opened; and,
    a hinged connector on an outside of the case, the hinged connector including:
       an electrical connector to which a handheld device is connected and disconnected, and
       a hinge which connects the hinged connector to the case, the hinge allowing the handheld device, when connected to the electrical connector, to rotate position with respect to the case;
    wherein the handheld device includes an infrared transceiver.

11. A method for expanding user versatility of a host computer comprising the step of:
    (a) placing a hinged connector on an outside of a case of the host computer including the following substeps:
       (a.1) providing an electrical connector to which a handheld device is connected and disconnected,
       (a.2) providing a hinge which connects the hinged connector to the case, the hinge allowing the handheld device, when connected to the electrical connector, to rotate position with respect to the case, and
       (a.3) providing an expandable speaker system as part of the hinged connector, a back of the speaker being expandable.

12. A method for expanding user versatility of a host computer comprising the step of:
    (a) placing a hinged connector on an outside of a case of the host computer including the following substeps:
       (a.1) providing an electrical connector to which a handheld device is connected and disconnected, and
       (a.2) providing a hinge which connects the hinged connector to the case, the hinge allowing the handheld device, when connected to the electrical connector, to rotate position with respect to the case;
    wherein in substep (a.1) the handheld device is a media clip pad which includes a touch-sensitive display.

13. A method as in claim 12 wherein in substep (a.1) the handheld device additionally includes a digital camera.

14. A method as in claim 13 wherein in substep (a.1) the digital camera includes a camera eye which is rotatable.

15. A method as in claim 13 wherein in substep (a.1) the digital camera includes a camera eye and flash assembly which are rotatable.

16. A method as in claim 12 wherein substep (a.1) includes the following substep:
    including an expansion port on the media clip pad.

17. A method as in claim 16 wherein substep (a.1) additionally includes the following substep:
    connecting a digital camera to the expansion port.

18. A method as in claim 12 wherein step (a) additionally includes the following step:
    (a.3) connecting a cellular phone to the electrical connector.

19. A method for expanding user versatility of a host computer comprising the step of:
    (a) placing a hinged connector on an outside of a case of the host computer including the following substeps:
       (a.1) providing an electrical connector to which a handheld device is connected and disconnected,
       (a.2) providing a hinge which connects the hinged connector to the case, the hinge allowing the handheld device, when connected to the electrical connector, to rotate position with respect to the case, and
       (a.3) connecting a pager to the electrical connector.

20. A method for expanding user versatility of a host computer comprising the step of:
    (a) placing a hinged connector on an outside of a case of the host computer including the following substeps:
       (a.1) providing an electrical connector to which a handheld device is connected and disconnected, and
       (a.2) providing a hinge which connects the hinged connector to the case, the hinge allowing the handheld device, when connected to the electrical connector, to rotate position with respect to the case;
    wherein in substep (a.1) the handheld device includes an infrared transceiver.

21. A computing system comprising:
    a case;
    a primary display available to a user when the case is opened; and,
    a hinged connector on an outside of the case, the hinged connector including:
       an electrical connector to which a handheld device is connected and disconnected, and
       a hinge which connects the hinged connector to the case, the hinge allowing the handheld device, when connected to the electrical connector, to rotate position with respect to the case;
    wherein the handheld device comprises a digital camera.

22. A method for expanding user versatility of a host computer comprising the step of:
    (a) placing a hinged connector on an outside of a case of the host computer including the following substeps:
       (a.1) providing an electrical connector to which a handheld device is connected and disconnected, and (a.2) providing a hinge which connects the hinged connector to the case, the hinge allowing the handheld device, when connected to the electrical connector, to rotate position with respect to the case;

wherein in substep (a.1) the handheld device comprises a digital camera.

23. A computing system comprising:

a case;

a primary display available to a user when the case is opened; and, a hinged connector on an outside of the case, the hinged connector including:

an electrical connector to which a handheld device is connected and disconnected, and     a hinge which connects the hinged connector to the case, the hinge allowing the handheld device, when connected to the electrical connector, to rotate position with respect to the case;

wherein the electrical connector is compatible with a data transfer interface.

24. A computing system as in claim 23 wherein the data transfer interface is a PCI bus interface.

25. A computing system as in claim 23 wherein the data transfer interface is a SCSI bus interface.

26. A method for expanding user versatility of a host computer comprising the step of:

(a) placing a hinged connector on an outside of a case of the host computer including the following substeps:

(a.1) providing an electrical connector to which a handheld device is connected and disconnected, and     (a.2) providing a hinge which connects the hinged connector to the case, the hinge allowing the handheld device, when connected to the electrical connector, to rotate position with respect to the case;

wherein the electrical connector is compatible with a data transfer interface.

27. A computing system as in claim 26 wherein in substep (a.1) the data transfer interface is a PCI bus interface.

28. A computing system as in claim 26 wherein in substep (a.1) the data transfer interface is a SCSI bus interface.

29. A computing system as in claim 26 wherein in substep (a.1) the data transfer interface is a personal computer memory card internal association (PCMCIA) card electrical interface.

* * * * *